(12) United States Patent
Niccum

(10) Patent No.: US 7,484,773 B2
(45) Date of Patent: Feb. 3, 2009

(54) SELF PURGING EXPANSION JOINT

(75) Inventor: Phillip K. Niccum, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 182 days.

(21) Appl. No.: 11/525,703

(22) Filed: Sep. 22, 2006

(65) Prior Publication Data
US 2008/0073907 A1 Mar. 27, 2008

(51) Int. Cl.
*F16L 27/10* (2006.01)
(52) U.S. Cl. .................. 285/226; 208/161; 208/164; 422/144; 422/147; 29/454
(58) Field of Classification Search .......... 285/226, 285/227, 228, 229, 904; 208/161, 164, 173; 422/144, 147; 29/890.14, 454
See application file for complete search history.

(56) References Cited

U.S. PATENT DOCUMENTS

| | | | |
|---|---|---|---|
| 2,470,989 A * | 5/1949 | Keller et al. ............. 285/145.5 |
| 3,241,868 A * | 3/1966 | Soderberg ................... 285/228 |
| 3,802,570 A | 4/1974 | Dehne |
| 4,165,107 A * | 8/1979 | Affa et al. ..................... 285/41 |
| 4,455,220 A | 6/1984 | Parker et al. |
| 4,502,947 A | 3/1985 | Haddad et al. |
| 4,692,311 A | 9/1987 | Parker et al. |
| 4,737,346 A * | 4/1988 | Haddad et al. ............. 422/144 |
| 4,741,883 A | 5/1988 | Haddad et al. |
| 4,778,488 A | 10/1988 | Koers |
| 5,311,715 A | 5/1994 | Linck |
| 5,383,316 A | 1/1995 | Burke et al. |
| 5,403,044 A * | 4/1995 | Holl ........................... 285/114 |
| 5,443,290 A | 8/1995 | Boyer et al. |
| 5,560,166 A | 10/1996 | Burke et al. |
| 5,569,435 A | 10/1996 | Fusco et al. |
| 5,869,008 A | 2/1999 | Dewitz |
| 6,296,282 B1 * | 10/2001 | Burkhardt et al. ............. 285/49 |
| 6,382,682 B1 * | 5/2002 | Taneda ....................... 285/300 |
| 6,695,358 B2 * | 2/2004 | Bonn ........................... 285/13 |
| 7,284,771 B2 * | 10/2007 | Baumann et al. ............ 285/226 |

* cited by examiner

*Primary Examiner*—David E Bochna
(74) *Attorney, Agent, or Firm*—KBR IP Legal

(57) ABSTRACT

Self purging expansion joint can include first annular seal sleeve connecting bellows to first conduit and second annular seal sleeve connecting bellows to second conduit. Flow-restricting orifice(s) can allow a higher pressure external fluid to flow through the annular passage to purge the bellows and into the primary fluid flow passage of the expansion joint containing a lower pressure fluid. Self purging expansion joint can be utilized in a disengager vessel of a fluid catalytic cracking (FCC) unit, for example, between primary and secondary stripping cyclones.

21 Claims, 4 Drawing Sheets

SELF PURGING EXPANSION JOINT

FIELD

The embodiments relate to an expansion joint, and more particularly, to a self purging expansion joint.

BACKGROUND

Expansion joints are utilized in various industries to connect a wide range of lines and equipment. An expansion joint can include a bellows in which foreign matter can form or accumulate so as to interfere with the operation of the expansion joint. For example, the deposition of coke and/or catalyst particles can occur in the bellows of an expansion joint of a fluid catalytic cracking (FCC) unit.

Circulating a fluid along and/or around a bellows can prevent the formation or accumulation of foreign matter, however separate fluid connection(s) to the expansion joint can create undesired complications as well as the installation, operating, and maintenance costs associated with the fluid connection(s).

BRIEF DESCRIPTION OF THE DRAWINGS

The detailed description will be better understood in conjunction with the accompanying drawings as follows.

Figure 1:
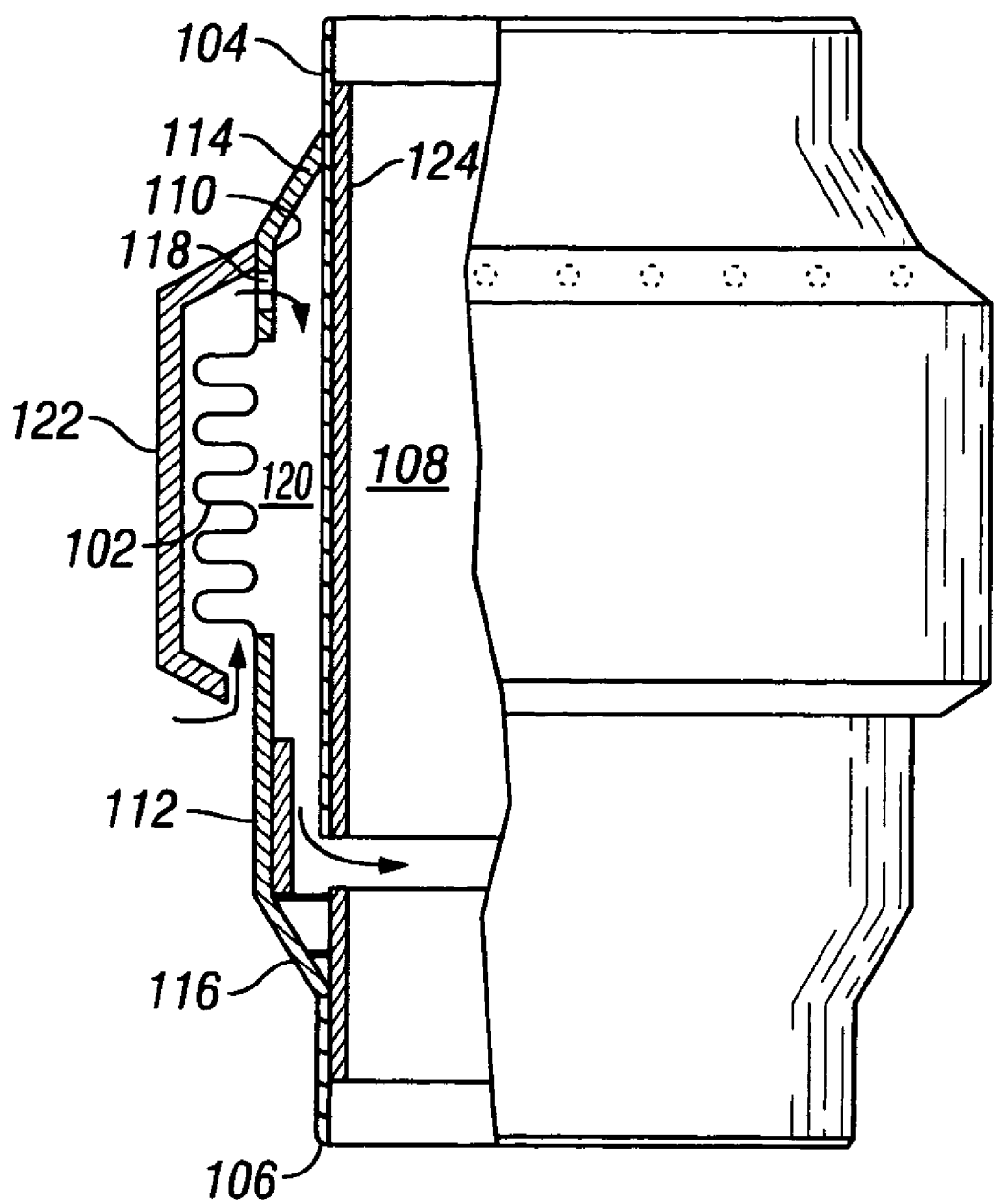
FIG. 1 depicts a partially cutaway illustration of a self purging expansion joint, according to one embodiment.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments relate to expansion joints, such as self purging expansion joints. A self purging expansion joint can be utilized when a fluid external to the expansion joint is at a higher pressure relative to an internal fluid within the expansion joint. For example, a self purging expansion joint can be disposed within a pressurized vessel.

In an embodiment, a self purging expansion joint can include a bellows disposed about first and second conduits moveable with respect to each other, a primary fluid flow passage through adjacent ends of the first and second conduits, a first annular seal sleeve forming a peripheral seal between the first conduit and a first end of the bellows, a second annular seal sleeve forming a peripheral seal between the second conduit and a second end of the bellows, a flow-restricting orifice in the first annular seal sleeve, and a purge fluid flow passage through the orifice, between the bellows and the first conduit, through a gap between the adjacent ends of the first and second conduits, and into the primary fluid flow passage. The flow-restricting orifice can include a fluid inlet from a pressurized region into an annular passage between the bellows and the first conduit. The gap can comprise an outlet from the annular passage into the primary fluid flow passage. A fluid in the pressurized region can be at a higher pressure relative to the primary fluid flow passage. One or a plurality of the flow-restricting orifices can provide a flow area for a pressure differential between a higher pressure fluid in the pressurized vessel and a fluid in the primary fluid flow passage, for example, more than zero to less than about 40 kilopascals.

A self purging expansion joint can include a protective covering over the bellows. A protective covering can overlie the flow-restricting orifice. A proximal end of the protective covering can be peripherally sealed to the first annular seal sleeve and an opening at a distal end of the protective covering can allow the ingress of a fluid from the pressurized vessel.

The flow-restricting orifice can be one or more circular flow-restricting orifices. The expansion joint can be in a pressurized vessel, which in an embodiment can be a disengager vessel of a fluid catalytic cracking (FCC) unit. One of the first or the second conduits can be in communication with an inlet or outlet of a cyclone. The first conduit can be in communication with one of an outlet of a primary cyclone and an inlet of a secondary cyclone, and the second conduit can be in communication with the other. The primary cyclone can be a closed cyclone.

A self purging expansion joint can include a hard refractory inner liner in at least one of the first conduit, second conduit, first annular seal sleeve, and second annular seal sleeve. The primary fluid flow passage can extend in a vertical orientation and the gap between the adjacent ends of the first and second conduits can be at a lower end of the expansion joint. The adjacent ends of the first and second conduits can be axially spaced to form the gap therebetween, or the adjacent ends can be concentric and radially spaced wherein one has a larger diameter than the other.

In an embodiment, an FCC unit can include a self purging expansion joint wherein the first conduit can be in communication with a secondary cyclone and the second conduit can be in communication with a sealed vapor outlet from a primary cyclone. The fluid catalytic cracking (FCC) unit can include an FCC disengager vessel, with the primary cyclone disposed within the disengager vessel to separate catalyst from FCC riser effluent and form a catalyst-lean stream of hydrocarbon vapors, a catalyst bed in a lower end of the FCC disengager vessel, and an inlet to the primary cyclone to supply the FCC riser effluent to the primary cyclone. The FCC unit can include a stripping fluid supply to the catalyst bed, and a stripped catalyst outlet from the catalyst bed through the lower end of the FCC disengager vessel. The primary cyclone can include a cyclone vessel, a cylindrical surface to separate solids from the suspension and form a vapor vortex of reduced solids content, the sealed vapor outlet from the primary cyclone in communication with the vortex, and a solids discharge outlet from a lower end of the primary cyclone.

Methods of purging an expansion joint for use inside a pressurized vessel can include providing a bellows disposed about first and second conduits having adjacent ends moveable with respect to each other, forming a primary fluid flow passage through the first and second conduits, forming a peripheral seal with a first annular seal sleeve between the first conduit and a first end of the bellows, forming a peripheral seal with a second annular seal sleeve between the second conduit and a second end of the bellows, and forming a purge fluid flow passage through a flow-restricting orifice in the first annular sleeve, between the bellows and the first conduit, through a gap between the adjacent ends of the first and second conduits, and into the primary fluid flow passage.

The methods can include selecting the size and quantity of the flow-restricting orifice to provide a flow area for a pressure differential between a relatively higher pressure external fluid and a relatively lower pressure fluid in the primary fluid flow passage to achieve a desired purge rate. In one embodiment, the pressure differential can be more than zero up to about 40 kilopascals. The method can include passing a fluid from a pressurized region through the flow-restricting orifice into an annular passage between the bellows and the first conduit to purge any foreign matter from the bellows. The methods can further include passing the fluid from the annular passage between the adjacent ends of the first and second conduits and into the primary fluid flow passage. The methods can include passing the fluid from the pressurized region between the bellows and a protective covering over the bellows before passing through the flow-restricting orifice.

The methods of purging a self purging expansion joint can include passing the purging fluid through the flow-restricting orifice of the expansion joint and into the primary fluid flow passage.

With reference to the figures, FIG. 1 depicts a partially cutaway illustration of a self purging expansion joint 100, according to one embodiment. "Purging" can refer to circulating a fluid, e.g. an external fluid, in or through a bellows to inhibit the formation or accumulation of solids in the expansion joint. "Self purging" can refer to the passive use of an ambient fluid at available pressure as the purge fluid, and may not require any external piping or lines for a dedicated fluid supplied from a remote source for the specific purpose of purging the internals of the expansion joint 100. AS exampled in the figure, a bellows 102 is disposed about first conduit 104 and second conduit 106. Bellows 102 can be any material suitable for the operating temperature and other conditions, including, but not limited to stainless steel or other metal(s), polymer, woven or nonwoven natural or synthetic fabric, or a combination thereof. Adjacent ends of the first and second conduits 104, 106 can be movable with respect to each other. A primary fluid flow passage 108 can extend through adjacent ends of the first and second conduits 104, 106. Fluid can flow through the self purging expansion joint 100, or more specifically, fluid can flow through primary fluid flow passage 108.

A first annular seal sleeve 110 can form a peripheral seal between the first conduit 104 and a first end of the bellows 102. A second annular seal sleeve 112 can form a peripheral seal between the second conduit 106 and a second end of the bellows 102. First and/or second annular seal sleeve 110, 112 can be cylindrical and include tapered or frustoconical connections 114, 116 to the respective first and second conduits 104, 106 as exampled in FIG. 1. The free end of the first conduit 104 can extend coaxially through the bellows 102 and the second annular seal sleeve 112 to adjacent the end of the second conduit 106.

Flow-restricting orifices 118 can be formed in the first annular seal sleeve 110 in communication with the annular passage 120 formed between bellows 102 and an outer surface of first conduit 104. In the embodiment exampled in FIG. 1, a plurality of circular orifices are formed around the circumference of the cylindrical section of the first annular seal sleeve 110. The orifices 118 can thus allow fluid external to the self purging expansion joint 100 to enter the generally annular passage 120 between the bellows 102 and the first conduit 104, through any gap between the opposing ends of the first and second conduits 104, 106, and then into the central passage 108 in the conduits 104, 106. The gap can be formed by an axial offset of the opposing ends of the first and second conduits 104, 106, or a radial gap can be present where the conduits 104, 106 are coaxial and have different diameters (see FIG. 3 discussed below). In general, axially offset conduits can have the same diameter, and in the case of radial gaps, the conduit that is downstream in the usual direction of fluid flow through the primary fluid flow passage can have a larger diameter than the upstream conduit.

The purge flow can result from a pressure differential between a higher pressure fluid external to the self purging expansion joint 100 and a lower pressure fluid contained within the primary fluid flow passage 108 of the expansion joint 100. The higher pressure fluid can be from a region of relatively high pressure relative to the primary fluid flow passage 108, such as, for example, a pressurized vessel containing the self purging expansion joint 100. In one embodiment, fluid external to the self purging expansion valve 100, for example, steam or other stripping fluid from a disengager vessel in an FCC unit, can be utilized as a purge fluid. Purge flow can result from a pressure differential between a fluid external to the self purging expansion joint 100 (e.g., at ambient or atmospheric pressure) and a fluid at a negative pressure relative to the external fluid (e.g., sub-atmospheric pressure) contained within the primary fluid flow passage 108 of the expansion joint 100.

The purge fluid flow into the annular passage 120 can sweep particles therefrom and can inhibit entry of fluid from the primary fluid flow passage 108. The purge flow can thereby aid in the reduction or elimination of the formation and/or accumulation of solids in the folds or other areas adjacent the bellows 102 which might otherwise adversely impact the ability of the expansion joint 100 to accommodate relative movement between the first and second conduits 104, 106. The purge flow can thus allow the expansion joint 100 to perform its intended function to relieve any stresses due to differential thermal expansion, for example.

Flow-restricting orifices 118 and/or annular passage 120 can be sized to allow a flow rate of fluid sufficient to aid in the prevention of the accumulation and/or formation of foreign matter that can interfere with the operation of the self purging expansion joint 100. "Flow-restricting" in reference to the orifices 118 implies that the orifices can collectively present the smallest effective hydraulic cross-sectional area in the purge fluid flow passage through the expansion joint 100 so that the flow rate can be effectively controlled by the size and quantity of orifices 118. Orifices 118 can be selected to provide a desired purge rate, for example, for an available pressure differential, expansion joint geometry and the fluid properties.

The size and quantity of the orifices 118 can be selected to provide a flow area for a pressure differential between a higher pressure fluid external to the expansion joint 100 and a fluid in the primary fluid flow passage 108 to achieve a desired purge rate. For example, in an FCC disengager vessel the pressure differential can be from more than zero to less than about 40 kilopascals in one embodiment, or from 1 to 20 kPa or from 5 to 15 kPa in other embodiments.

Optionally, a shroud or protective covering 122 can be included, for example, over the bellows 102. The covering 122 can be in the form of a rigid cylinder to keep bellows 102 from being damaged by unexpected impact from tools or personnel during maintenance or other operations. The protective covering 122 can also overlie the orifices 118. One end of the protective covering 122 can be peripherally sealed to the first annular seal sleeve 110 and a free end of the protective covering 122 can provide an opening to an annular passage between the protective covering 122 and the bellows 102 to allow the ingress of the ambient purge fluid to the orifices 118, as exampled in FIG. 1. Flow along the exterior of the bellows 102, especially where the cross sectional flow area is greater than through the orifices 118, and a vertical or upward purge fluid flow orientation can aid in the reduction or elimination of the formation and/or accumulation of foreign matter.

An optional inner liner 124 can be used in the first conduit 104, second conduit 106, first annular seal sleeve 110, second annular seal sleeve 112, or a combination thereof. For example, the inner liner 124 can include a thermal refractory material of sufficient hardness to resist erosion from particles entrained in the primary fluid flow.

Conduits (104, 106), annular seal sleeves (110, 112), bellows 102, and/or protective covering 122 can have a generally tubular or cylindrical shape having a transverse cross-section that is circular, rectangular, or the like. Orifices 118 and/or annular passage 120 can also be configured to allow a flow rate of fluid sufficient to aid in the prevention of the accumulation and/or formation of foreign matter that might otherwise interfere with the operation of the self purging expansion joint 100.

As one specific example in the sealed plenum of a commercial FCC disengager vessel, the inside diameter of the primary fluid flow passage 108 can be 91 cm, a radial spacing between the bellows 102 and the first conduit 104 can be 1.27 cm, and the annular passage 120 can have an area of 365 cm2. With 24 orifices 118, each having a diameter of 0.69 cm for a total orifice area of 8.8 cm2, a pressure differential of 6.9 kPa, and a flow velocity in the primary fluid flow passage 108 of 126 m/s, the velocity through annular passage 120 can be 3 m/s.

Figure 2:
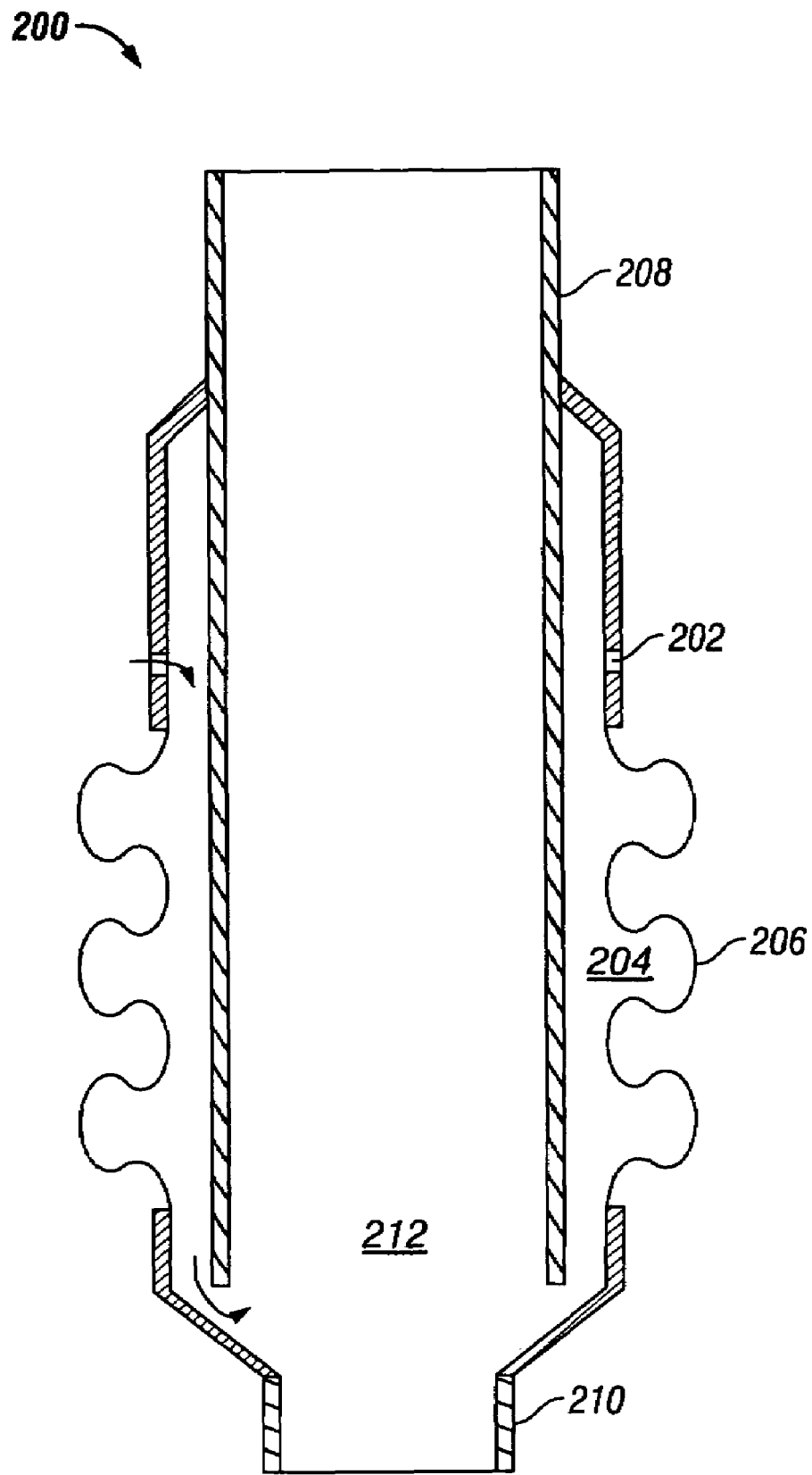
FIG. 2 depicts a cross-sectional schematic illustration of a self purging expansion joint, according to one embodiment.

FIG. 2 depicts a cross-sectional schematic illustration of a self purging expansion joint 200, according to one embodiment. A pressure differential between a lower pressure fluid on the interior and a fluid on the exterior of the self purging expansion joint 200 can allow the external fluid to flow through orifices 202, along the annular passage 204 between the bellows 206 and the first conduit 208 to purge any foreign matter there from, through the gap between the adjacent ends of the first conduit 208 and second conduit 210, and into the primary fluid flow passage 212 collectively defined by the central passages of the first conduit 208 and second conduit 210. In the embodiment of FIG. 2, the gap is axial and defined by axially spaced adjacent ends of the conduits 208, 210. First conduit 208 can have the same or differing inner and/or outer diameters as the second conduit 216.

Figure 3:
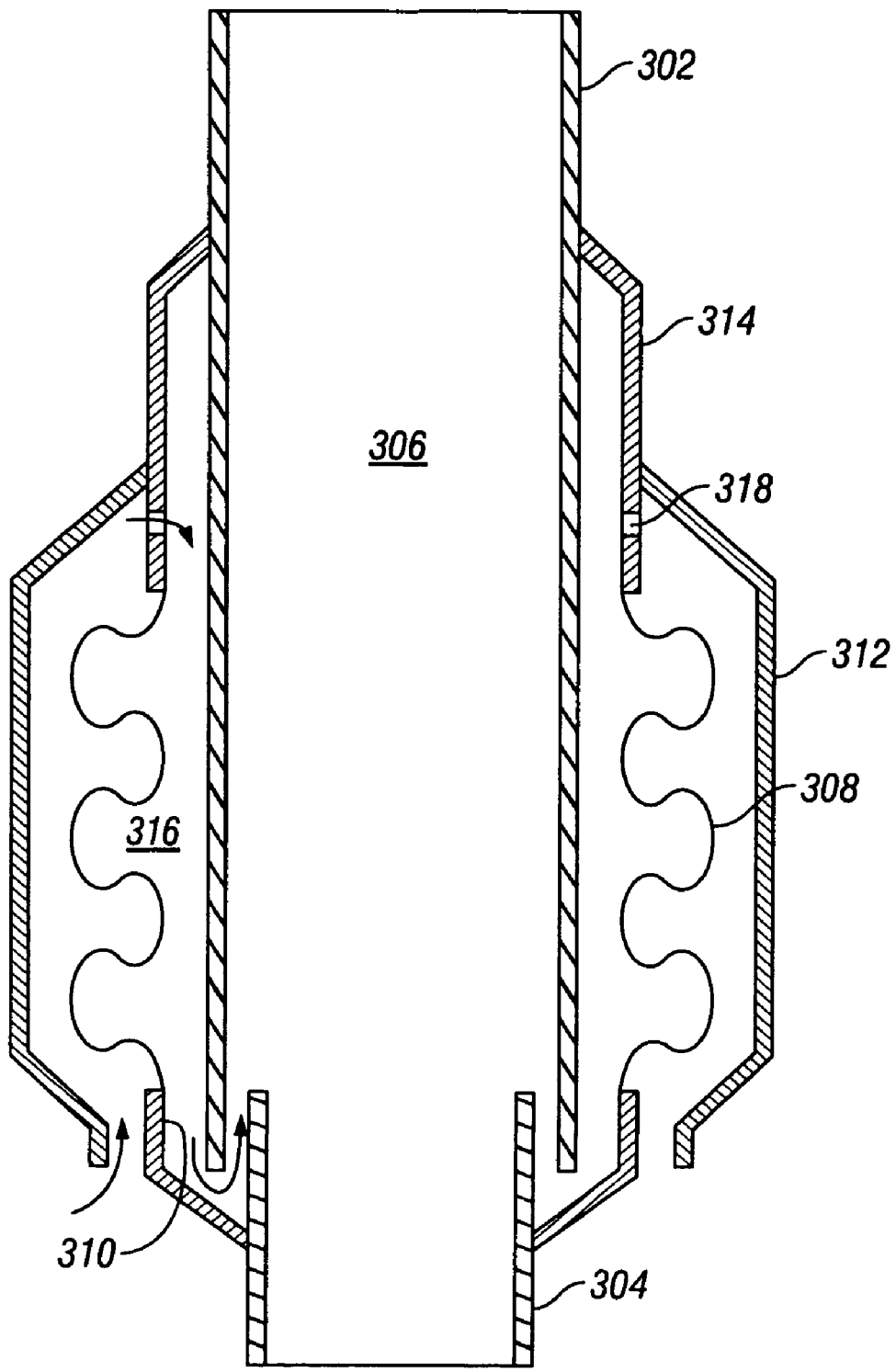
FIG. 3 depicts a cross-sectional schematic illustration of a self purging expansion joint, according to one embodiment.

FIG. 3 depicts a cross-sectional schematic illustration of a self purging expansion joint 300, according to one embodiment of the invention. In the embodiment exampled in FIG. 3, the gap is radial and defined by overlapping the ends of the first and second conduits 302, 304 where an outside diameter of the smaller conduit is smaller than an inside diameter of the larger conduit. The conduits 302, 304 can have a vertical orientation, i.e. an axis of the primary fluid flow passage 306 defined thereby is vertical. Lower conduit 304 can be oriented upstream with respect to flow through the primary fluid flow passage, and the upstream conduit can have a smaller diameter than the downstream conduit, and in an embodiment can provide a venturi effect. The illustrated configuration thus further facilitates keeping debris out of the area near the bellows 308. The annular seal sleeve 310 associated with the second conduit 304 can have a cylindrical section that has a larger inside diameter than the outer diameter of the first conduit 302 to moveably receive the end of the first conduit 302. The embodiment depicted in FIG. 3 includes a protective covering 312 attached to the first annular seal sleeve 314.

A pressure differential between the annular passage 316 and a higher pressure fluid on the exterior of the self purging expansion joint 300 can allow the higher pressure external fluid to flow into the circumferential gap between the protective covering 312 and the exterior of the bellows 308, through orifice(s) 318 into the annular passage 316 (e.g., along the bore of the bellows 308) to purge any foreign matter, into the path defined by the gap between the bore of the second annular seal sleeve 310 and the exterior of the first conduit 302 and the gap between the bore of the first conduit 302 and the exterior of the second conduit 304, and into the primary fluid flow passage 306 of the self purging expansion joint 300.

Figure 4:
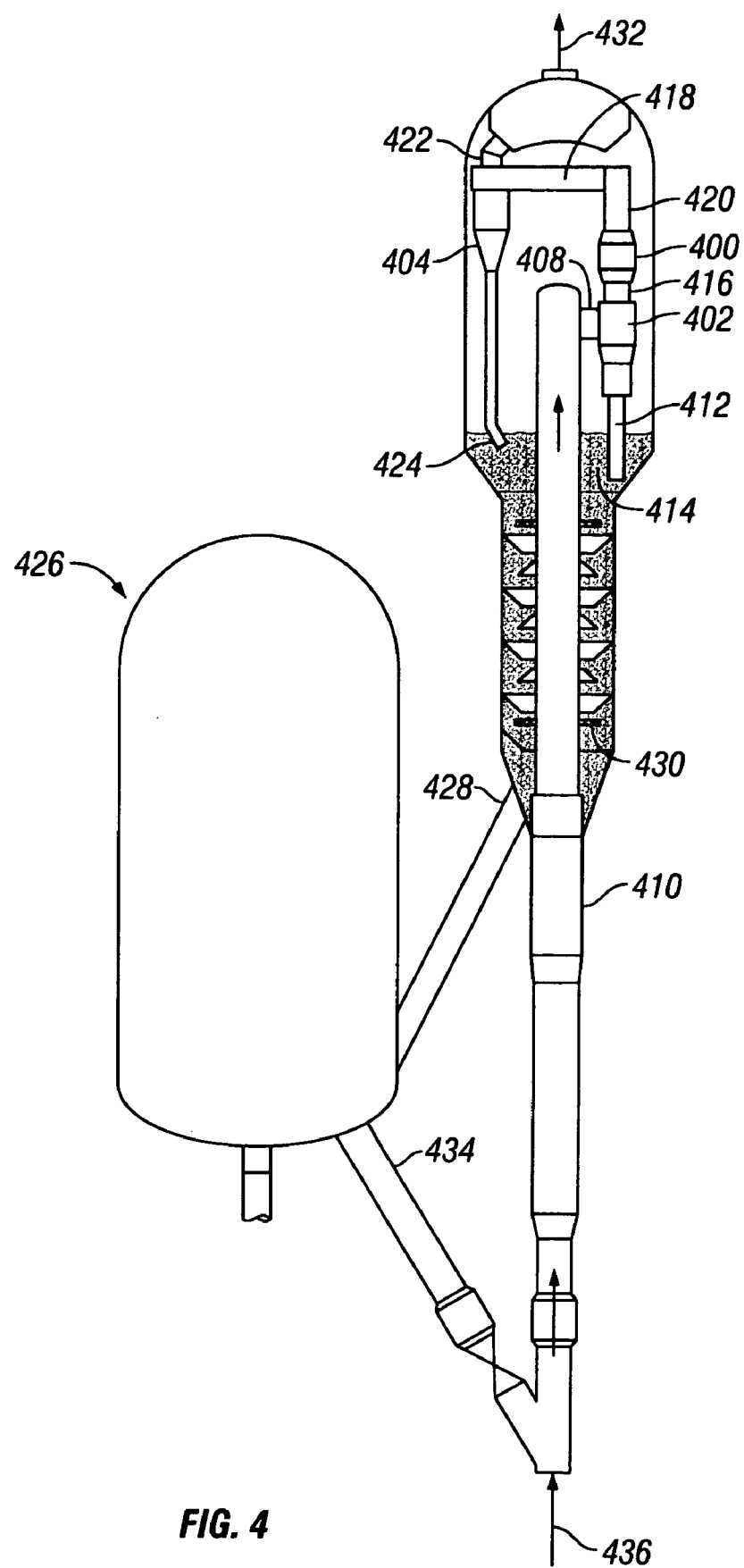
FIG. 4 depicts a schematic illustration of a self purging expansion joint disposed between primary and secondary cyclones in a disengager vessel of a fluid catalytic cracking (FCC) unit, according to one embodiment.

FIG. 4 depicts a schematic illustration of a self purging expansion joint 400 disposed between a primary cyclone 402 and secondary cyclone 404 in a disengager vessel 406 of a fluid catalytic cracking (FCC) unit, according to one embodiment.

Disengager vessel 406 can contain a pressurized fluid, for example, a stripping fluid such as, but not limited to, steam. Stripping in disengager vessel 406 is optional, for example, separate vessel(s) can be utilized for stripping. Primary cyclone 402 can have an inlet 408 to receive a fluid/particulate suspension (i.e., FCC riser effluent) from an FCC riser 410. Primary cyclone 402 can be a closed cyclone. Primary cyclone 402 can include an outlet 412 to allow catalyst solids to discharge therefrom into a dense bed 414, which can optionally be operated as a stripping bed with a stripping fluid such as steam supplied thereto. Vapor outlet from the primary cyclone 402 can connect to a self purging expansion joint 400, or more specifically, connect to the second conduit 416 thereof, and can pass a catalyst-lean stream of hydrocarbon vapor therethrough. Tangential inlet 418 of secondary cyclone 404 can connect to self purging expansion joint 400, or more specifically to the first conduit 420 thereof. Secondary cyclone 404 can have a vapor outlet 422 and an outlet 424 which can discharge a catalyst solid 414.

The FCC unit of the embodiment exampled in FIG. 4 includes a regenerator 426 offset from the disengager vessel 406, and the disengager vessel 406 positioned vertically over the riser 410, with the riser 410 passing through bed 414. Stripped catalyst can be supplied to the regenerator 426 via the transfer line 428. Diplegs 412, 424 can be sealed in the catalyst bed 414, or alternatively can include trickle valves (not shown). Stripping gas, if employed, can be supplied via a conventional distributor 430 near the bottom of the catalyst bed 414. A blend of process vapor lean in suspended solids can be recovered from overhead outlet 432. Regenerated catalyst can be recirculated to the riser 410 via the transfer line 434 along with a fresh feed stream 436.

Fluid contained within the dilute phase of the main disengager vessel 406 can enter into the flow-restricting orifice(s) in the self purging expansion joint 400. A catalyst-lean stream of hydrocarbon vapor discharged from the primary cyclone 402 can be at a lower pressure than the stripping fluid.

Orifice(s) can be sized to restrict the amount of flow of stripping fluid therethrough to that sufficient to purge the expansion joint 400. The stripping fluid utilized as a purge fluid can discharge into the primary fluid flow passage of the self purging expansion joint 400, which can pass the catalyst-lean stream of hydrocarbon vapor. Because a fluid within the disengager vessel 406 (e.g., stripped vapors and/or any stripping fluid) can be utilized as a purge fluid, no separate fluid supply and/or connections to the expansion joint 400 are required, simplifying installation, operation, and/or maintenance.

While these embodiments have been described with emphasis on the embodiments, it should be understood that within the scope of the appended claims, the embodiments might be practiced other than as specifically described herein.

What is claimed is:

1. A self purging expansion joint for use with an externally pressurized fluid comprising:
   a bellows disposed about first and second conduits having adjacent ends moveable with respect to each other;
   a primary fluid flow passage through the first and second conduits;
   a first annular seal sleeve forming a peripheral seal between the first conduit and a first end of the bellows;
   a second annular seal sleeve forming a peripheral seal between the second conduit and a second end of the bellows;
   a flow-restricting orifice in the first annular seal sleeve;
   a purge fluid flow passage through the orifice, between the bellows and the first conduit, through a gap between the adjacent ends of the first and second conduits, and into the primary fluid flow passage; and
   a protective covering disposed about the bellows, wherein a proximal end of the protective covering is peripherally sealed to the first annular seal sleeve and an opening at a distal end of the protective covering allows the ingress of the externally pressurized fluid.

2. The self purging expansion joint of claim 1, wherein the orifice comprises a fluid inlet from a pressurized region into an annular passage between the bellows and the first conduit.

3. The self purging expansion joint of claim 2, wherein the gap comprises an outlet from the annular passage into the primary fluid flow passage.

4. The self purging expansion joint of claim 2, wherein a fluid in the pressurized region is at a high pressure relative to the primary fluid flow passage.

5. The self purging expansion joint of claim 1, further comprising a hard refractory inner liner in at least one of the first conduit, second conduit, first annular seal sleeve, and second annular seal sleeve.

6. The self purging expansion joint of claim 1 wherein the primary fluid flow passage extends in a vertical orientation and the gap between the adjacent ends of the first and second conduits is at a lower end of the expansion joint.

7. The self purging expansion joint of claim 1 wherein the adjacent ends of the first and second conduits are axially spaced to form the gap therebetween.

8. The self purging expansion joint of claim 1 wherein the adjacent ends of the first and second conduits are concentric and radially spaced and one of the adjacent ends has a larger diameter than the other to form the gap therebetween.

9. A pressurized vessel housing the self purging expansion joint of claim 1, wherein one or a plurality of the flow-restricting orifices provide a flow area for a pressure differential between a relatively high pressure fluid in the pressurized vessel and a fluid in the primary fluid flow passage.

10. The self purging expansion joint of claim 9, wherein the pressurized vessel is a disengager vessel of a fluid catalytic cracking (FCC) unit.

11. The self purging expansion joint of claim 10, wherein one of the first or the second conduits is in communication with an outlet of a cyclone.

12. The self purging expansion joint of claim 10, wherein the first conduit is in communication with one of an outlet of a primary cyclone and an inlet of a secondary cyclone, and the second conduit is in communication with the other.

13. The self purging expansion joint of claim 1, wherein the flow-restricting orifice is a plurality of circular flow-restricting orifices.

14. A self purging expansion joint for use with an externally pressurized fluid comprising:
   a bellows disposed about first and second conduits having adjacent ends moveable with respect to each other;
   a primary fluid flow passage through the first and second conduits;
   a first annular seal sleeve forming a peripheral seal between the first conduit and a first end of the bellows;
   a second annular seal sleeve forming a peripheral seal between the second conduit and a second end of the bellows;
   a flow-restricting orifice in the first annular seal sleeve;
   a purge fluid flow passage through the orifice between the bellows and the first conduit, through a gap between the adjacent ends of the first and second conduits, and into the primary fluid flow passage;
   a protective covering disposed about the bellows, wherein the protective covering overlies the flow-restricting orifice, and wherein a proximal end of the protective covering is peripherally sealed to the first annular seal sleeve and an opening at a distal end of the protective covering allows the ingress of the externally pressurized fluid.

15. A fluid catalytic cracking (FCC) unit comprising:
   a self purging expansion joint for use with an externally pressurized fluid, comprising:
      a bellows disposed about first and second conduits having adjacent ends moveable with respect to each other;
      a primary fluid flow passage through the first and second conduits;
      a first annular seal sleeve forming a peripheral seal between the first conduit and a first end of the bellows;
      a second annular seal sleeve forming a peripheral seal between the second conduit and a second end of the bellows;
      a flow-restricting orifice in the first annular seal sleeve; and
      a purge fluid flow passage through the orifice, between the bellows and the first conduit, through a gap between the adjacent ends of the first and second conduits, and into the primary fluid flow passage,
      wherein the first conduit is in communication with a secondary cyclone and the second conduit is in communication with a sealed vapor outlet from a primary cyclone;
   a FCC disengager vessel with the primary cyclone disposed within the disengager vessel to separate catalyst from FCC riser effluent and form a catalyst-lean stream of hydrocarbon vapors;
   a catalyst bed in a lower end of the FCC disengager vessel;
   an inlet to the primary cyclone to supply the FCC riser effluent to the primary cyclone;
   an optional stripping fluid supply to the catalyst bed; and
   a catalyst outlet from the catalyst bed through the lower end of the FCC disengager vessel;
   wherein the primary cyclone further comprises:
      a cyclone vessel;
      a cylindrical surface to separate solids from the suspension and form a vapor vortex of reduced solids content;
      the sealed vapor outlet from the primary cyclone in communication with the vortex; and
      a solids discharge outlet from a lower end of the primary cyclone.

16. A method of purging the self purging expansion joint of claim 15, comprising: passing fluid from a vapor space in the disengager vessel through the flow-restricting orifice of the expansion joint and into the primary fluid flow passage.

17. The method of claim 16, further comprising maintaining a pressure differential between the vapor space in the disengager vessel and the primary fluid flow passage within a range of from more than zero up to 40 kilopascals.

18. A method of purging an expansion joint for use with an externally pressurized fluid comprising:

providing a bellows disposed about first and second conduits having adjacent ends moveable with respect to each other, wherein a protective covering is disposed about the bellows;

forming a primary fluid flow passage through the first and second conduits;

forming a peripheral seal with a first annular seal sleeve between the first conduit and a first end of the bellows, wherein a proximal end of the protective covering is peripherally sealed to the first annular seal sleeve and an opening at a distal end of the protective covering allows the ingress of the externally pressurized fluid;

forming a peripheral seal with a second annular seal sleeve between the second conduit and a second end of the bellows; and forming a purge fluid flow passage through the opening at the distal end of the protective covering, between the protective covering and the bellows, through a flow-restricting orifice in the first annular sleeve, between the bellows and the first conduit, through a gap between the adjacent ends of the first and second conduits, and into the primary fluid flow passage.

19. The method of claim 18, further comprising selecting the size and quantity of the flow-restricting orifice to provide a flow area for a pressure differential between a relatively higher pressure external fluid and a fluid in the primary fluid flow passage effective to control a rate of purge fluid flow.

20. The method of claim 18, further comprising passing a fluid from a pressurized region through the flow-restricting orifice into an annular passage between the bellows and the first conduit to purge foreign matter from the bellows.

21. The method of claim 20, further comprising passing the fluid from the annular passage between the adjacent ends of the first and second conduits and into the primary fluid flow passage.

* * * * *